United States Patent [19]

Mull et al.

[11] Patent Number: 4,468,868
[45] Date of Patent: Sep. 4, 1984

[54] GAS-SOLID COUNTERFLOW VESSEL

[75] Inventors: Lee R. Mull, Newark; Mark A. Propster, Gahanna, both of Ohio

[73] Assignee: Owens-Corning Fiberglas Corporation, Toledo, Ohio

[21] Appl. No.: 393,960

[22] Filed: Jun. 30, 1982

[51] Int. Cl.³ .............................................. F26B 17/14
[52] U.S. Cl. ........................................ 34/165; 34/168
[58] Field of Search ................... 34/165, 168; 432/95, 432/96, 99, 100, 101, 102

[56] References Cited

U.S. PATENT DOCUMENTS 2,458,434  1/1949  Simpson ................................. 34/168
2,703,936  3/1955  Hut ........................................ 34/168
3,300,873  1/1967  Bussell et al. ......................... 34/168
4,316,732  2/1982  Propster et al. ....................... 65/27

FOREIGN PATENT DOCUMENTS 2742297  3/1979  Fed. Rep. of Germany ........ 34/168

Primary Examiner—Larry I. Schwartz
Assistant Examiner—David W. Westphal
Attorney, Agent, or Firm—Ronald C. Hudgens; Patrick P. Pacella; Philip R. Cloutier

[57]    ABSTRACT

A gas to solid contacting apparatus comprising a chamber, at least one solid inlet conduit opening into the chamber, at least one gas inlet conduit opening into the chamber, the gas inlet and outlet comprising superimposed conduits.

9 Claims, 11 Drawing Figures

GAS-SOLID COUNTERFLOW VESSEL

TECHNICAL FIELD

This invention relates to a vessel in which gas and solids flow in countercurrent relationship.

This invention pertains to the field of gas-solid contact as, for example, particulate solid preheating, solid absorption from gases and catalyst to gas contacting processes wherein the two materials move countercurrently through the vessel.

BACKGROUND OF THE INVENTION

In one of its more specific aspects, this invention pertains to an apparatus for solid-gas contact in which the gas moves upwardly through the bed and the solids, which form the bed, more downwardly.

Vessels of this type are well known. In conventional designs, the solids are introduced into the upper portion of the vessel and the gas is introduced through a conduit opening into the lower portion of the vessel.

In certain instances, however, it is impossible to introduce the gas through openings in the lower portion of the vessel. In other instances, it is difficult to remove the gas from the upper portion of the vessel because the gas outlet tends to become obstructed with solids. The apparatus of the present invention is directed to the solution of these problems.

STATEMENT OF THE INVENTION

According to this invention, there is provided gas to solid contacting apparatus comprising a chamber, at least one solid inlet conduit opening into the chamber, at least one gas inlet conduit opening into the chamber, the gas inlet conduit discharging into the lower portion of the chamber through a truncated cone, at least one gas outlet conduit opening from the chamber, the gas inlet and the gas outlet comprising superimposed conduits.

BRIEF DESCRIPTION OF THE DRAWINGS

The apparatus of this invention will be more easily understood if explained in conjunction with the attached drawings in which.

DESCRIPTION OF THE INVENTION

Figure 1:
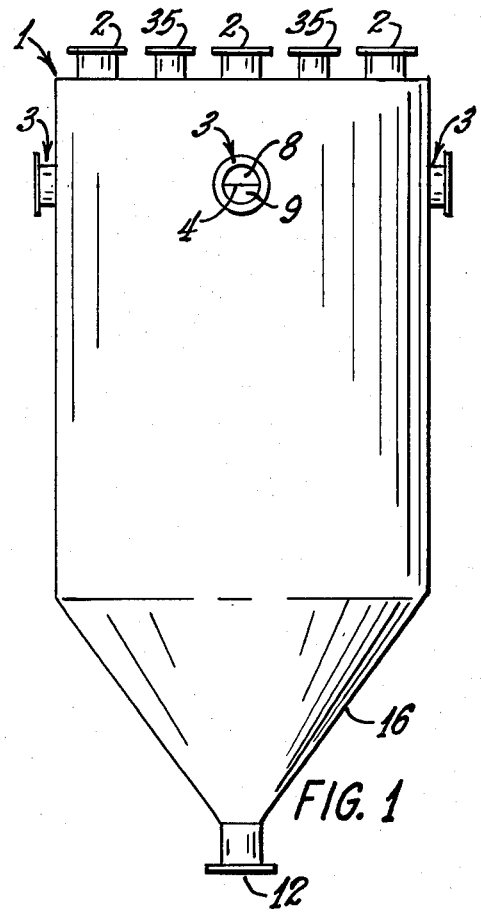
FIG. 1 is a view of the vessel in elevation.

Referring now to FIG. 1, there is shown vessel 1 having one or more solid inlet conduits 2 and one or more gas inlet/outlet conduits 3. The latter are partitioned by means of partition baffle 4 to subdivide the conduit into two sections, section 8 being the gas inlet section and section 9 being the gas outlet section. Vessel 1 will preferably have a conical lower section 16 terminating in solid outlet conduit 12.

The outlet portion of the gas inlet/outlet conduits referred to here can actually comprise an outlet by-pass for a portion of the gases passing through the bed, the balance of the gas passing through the solids positioned thereabove and out through one or more conduits 35.

Figure 2:
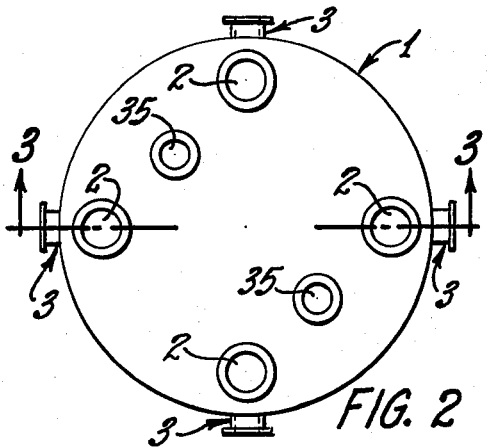
FIG. 2 is a plan view of the vessel from the top.

Referring now to FIG. 2, there are shown four conduit solid inlets 2 and four conduit gas inlets/outlets 3 although any number of each can be employed. Principal gas outlets 35 are also shown.

Figure 3:
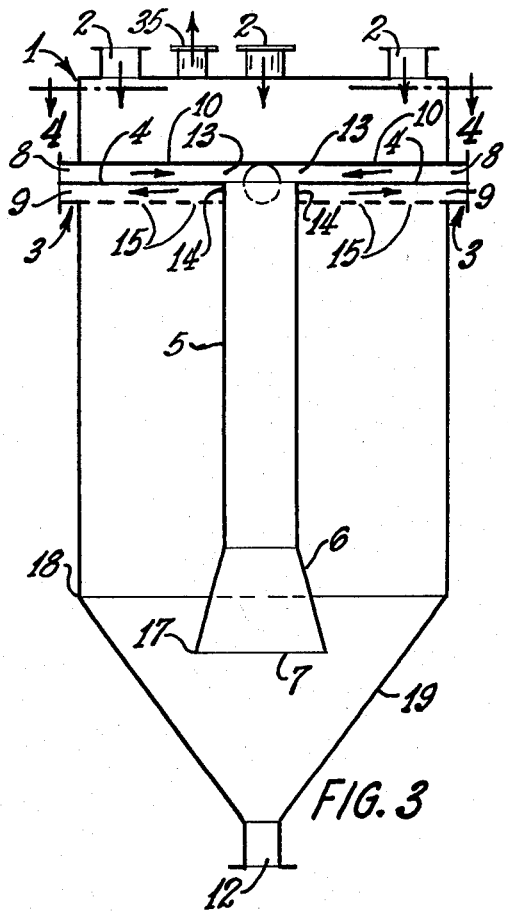
FIG. 3 is a view of the vessel through section 3—3 of FIG. 2.
Figure 4:
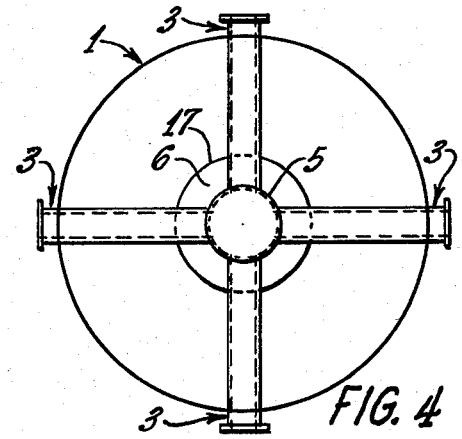
FIG. 4 is a cross-sectional view of the vessel through section 4—4 of FIG. 3.

Referring now to FIGS. 3 and 4, there is shown internal gas conduit 5 and its relationship to gas inlet/outlet conduit 3. Internal gas conduit 5 extends any suitable depth down into vessel 1. Gas conduit 5 terminates in truncated cone 6 having open end 7, the base 17 of the truncated cone preferably extending beneath point 18 at which point sides 19 of the vessel angle inwardly.

Gas inlet/outlet conduit 3 is partitioned by means of baffle 4 into gas inlet conduits 8 and gas outlet conduits 9. Gas inlet conduits 8 open into gas conduit 5 through opening 13 therebetween. Gas outlet conduit 9 opens from the internal portion of the vessel through openings 15 which can be of any suitable number, size and configuration. Gas outlet conduit 9 is terminated at its inner end by baffle 14 so that all gas entering the gas outlet conduit flows out of the vessel.

Any suitable arrangement of the gas inlet/outlet conduit 3 can be employed, both in respect to the configuration of the combined conduits and their relationship to each other. FIGS. 5 through 9 depict a few of these embodiments. It will be seen that in each embodiment, gas inlet-outlet conduit is comprised of a gas inlet section 8 and a gas outlet section 9 in superimposed relationship, the sections being separated by partition 4. It is preferable that all inlet/outlet combinations be comprised of an upwardly-directed apex 10.

Figure 5:
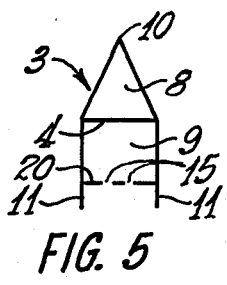
FIG. 5 is a cross-sectional view of one embodiment of the gas inlet/outlet conduit.

In FIG. 5, the gas inlet-outlet conduit is comprised of a triangular shaped upper gas inlet section 8 with apex 10 extending upwardly therefrom. Gas outlet section 9 is adapted with a plurality of apertures 15 for the entrance of gas thereinto. Downward extending sections 11 act to shield apertures 15 and extend below the lower wall 20 of gas outlet section 9 any suitable length as a means of preventing the downward passing solids from obstructing apertures 15.

Figure 6:
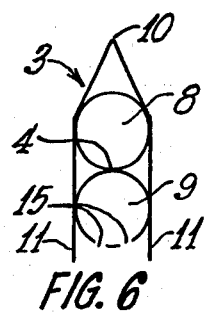
FIG. 6 is another cross-sectional view of another embodiment of the gas inlet/outlet conduit.

In FIG. 6, gas inlet-outlet conduit 3 is comprised of two tubular members, the walls thereof acting as partition 4. Apex 10 extends upwardly therefrom and sections 11 extend downwardly therefrom, apertures 15 being formed in the walls of gas outlet section 9.

Figure 7:
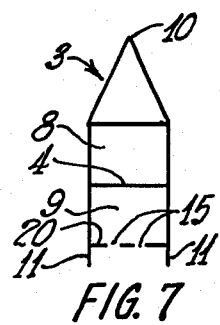
FIG. 7 is a cross-sectional view of another embodiment of the gas inlet/outlet conduit.

In FIG. 7, the gas inlet-outlet conduit 3 is comprised of two rectangular members using a common wall as partition 4. Apex 10 extends upwardly therefrom and sections 11 extend downwardly therefrom.

Figure 8:
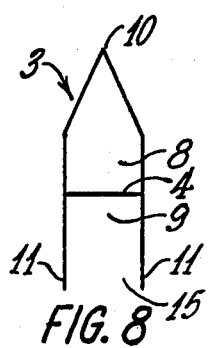
FIG. 8 is a cross-sectional view of another embodiment of the gas inlet/outlet conduit.

In FIG. 8, gas inlet-outlet conduit 3 is comprised of an upper triangular member 8, apex 10 of which extends upwardly therefrom. The lower gas outlet section 9 is rectangular, the lower portion being open along the entire length of its lower wall forming aperture 15. The sides 11 form the downwardly extending sections.

It will be understood that in all instances, including the employment of tubular members, the lower wall of gas outlet section 9 can comprise a slot, or series of slots, or an opening continuous along its length.

Figure 9:
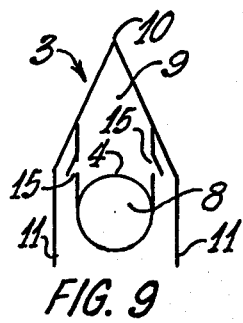
FIG. 9 is a depiction of another embodiment of the gas inlet/outlet conduit.

In FIG. 9 there is shown gas inlet-outlet conduit 3 in which inlet conduit 8 has superimposed upon it outlet conduit 9, gas entering conduit 9 through apertures 15 formed between the supports which maintain conduit 9 superimposed on conduit 8. As in the previous embodiments, apex 10 extends upwardly therefrom and sections 11 extend downwardly therefrom.

Figure 10:
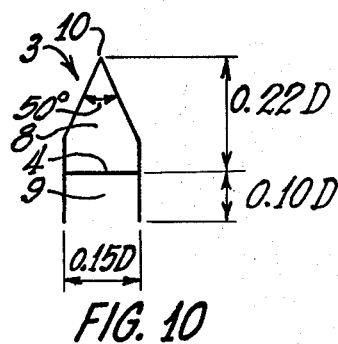
FIG. 10 is a depiction of the preferred embodiment of the gas inlet/outlet conduit; and, FIG. 11 is a depiction of the preferred embodiment of the vessel in elevation.

FIG. 10 depicts the preferred embodiment of the gas inlet-outlet conduit 3. It is comprised of a triangular gas inlet section 8 superimposed on a rectangular gas outlet section 9, this section being open along its entire length. The inlet section has an apex angle of about 50°, and the height of the inlet section is equal to about 0.16D, wherein D is the diameter, in inches, of the vessel into which the gas is introduced. The height of the gas outlet section is about 0.16D and the width thereof is about 0.15D, D being as previously defined.

Figure 11:
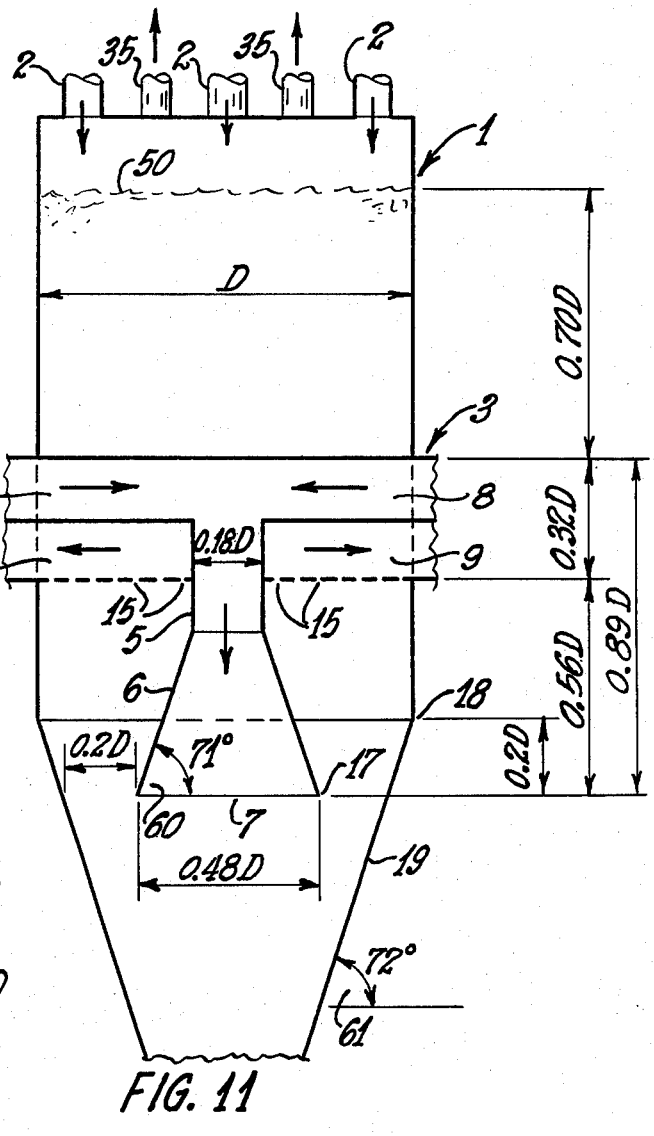

FIG. 11 depicts the preferred embodiment of the gas inlet-outlet conduit in relation to the size of the vessel, its internal gas conduit and the truncated cone at its terminus. Assuming a vessel diameter of D, the upper wall of the gas inlet-outlet conduit is located at a distance of about 0.89D above the base of the gas inlet conduit cone. The gas inlet-outlet conduit has a combined, overall depth of about 0.32D and the distance from the base of the gas inlet-outlet conduit to the base of the gas inlet conduit cone is about 0.56D, the upper circular portion thereof having a diameter of about 0.18D. The distance from the apex of the gas inlet-outlet conduit to the top of solids 50 is about 0.70D.

The distance between the base of the truncated cone and the inwardly sloping walls of the chamber is about 0.2D, with the base of the truncated cone having a diameter of about 0.48D, the upwardly extending sides of the truncated cone forming with its base an angle 60 of about 71°. The outwardly sloping sides of the truncated cone forming the base of the vessel form an angle 61 of about 72° with the horizontal.

It is evident from the foregoing that various modifications can be made to this invention. Such, however, are considered within the scope of the invention.

We claim:

1. A gas to solids contacting apparatus comprising:
   (a) a chamber;
   (b) at least one solid inlet conduit having an opening into said chamber;
   (c) at least one gas inlet conduit leading to, and in communication with, a gas inlet duct, the gas inlet duct being generally vertical, centrally located, and extending downward from the gas inlet conduit, and having an opening into said chamber, said gas inlet duct discharging into the lower portion of said chamber and terminating in a truncated cone;
   (d) at least one gas outlet conduit having an opening into the top of the chamber;
   (e) at least one bypass gas outlet conduit having an opening into the chamber intermediate the truncated cone opening of (c) and the top outlet opening of (d); and
   (f) the gas inlet conduit of (c) and bypass gas conduit of (e) being positioned in superimposed relationship.

2. The apparatus of claim 1 in which said gas inlet conduit of (c) and said gas outlet conduit of (e) are separated by a partition baffle therebetween.

3. The apparatus of claim 1 in which said gas inlet conduit of (c) is superimposed on said gas outlet conduit of (e).

4. The apparatus of claim 1 in which said gas outlet conduit of (e) is superimposed on said gas inlet conduit of (c).

5. The apparatus of claim 1 in which one of said superimposed gas conduits comprises an upwardly-directed apex.

6. The apparatus of claim 1 in which said gas outlet conduit of (e) is open along the total length of its lower wall.

7. The apparatus of claim 1 in which said gas inlet conduit of (c) has a triangular configuration.

8. The apparatus of claim 1 in which said chamber has a diameter of D and the upper wall of the superimposed conduit is positioned at a distance of about 0.89D above the base of said truncated cone.

9. The apparatus of claim 8 in which said superimposed conduits have an overall depth of about 0.32D, and the distance from the base of the superimposed conduits to the base of the truncated cone is about 0.56D.

* * * * *